Patented Nov. 1, 1938

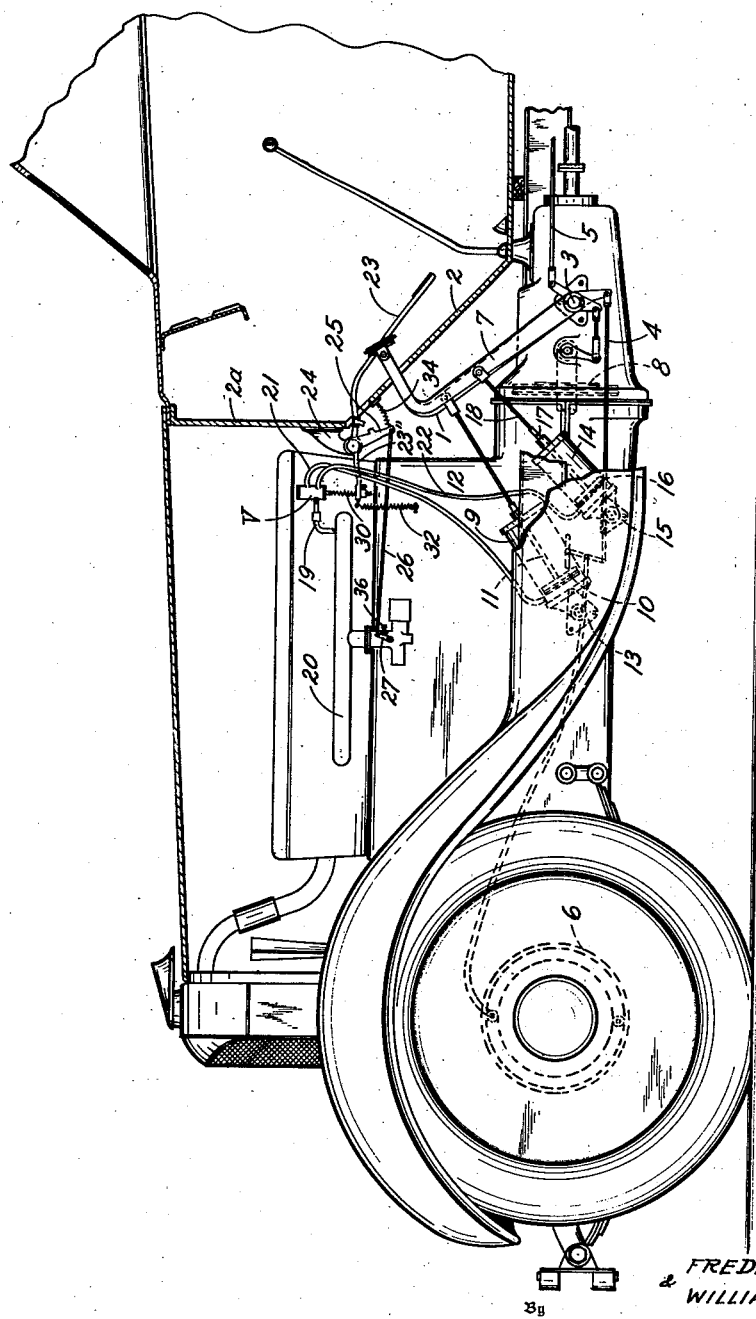

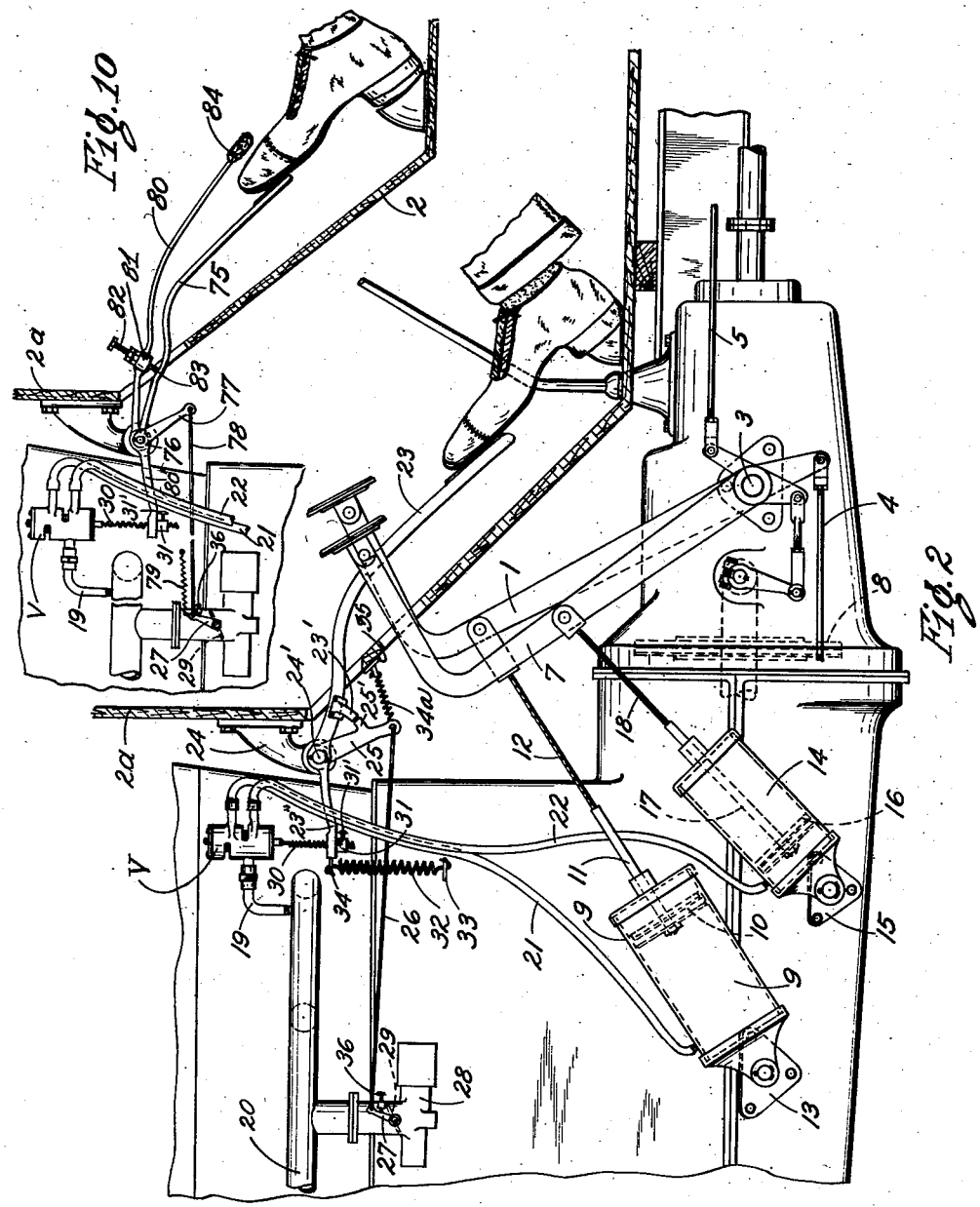

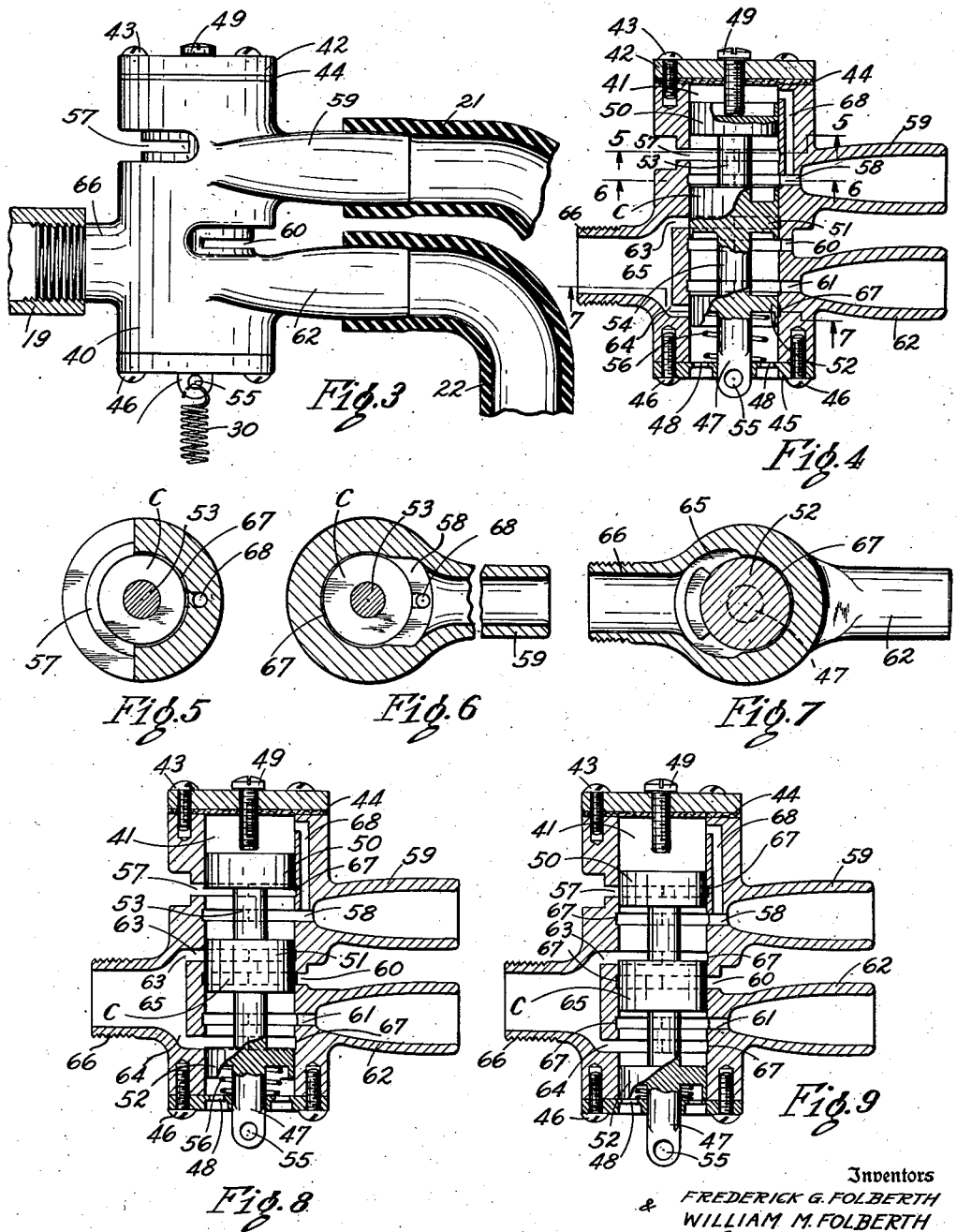

2,135,071

UNITED STATES PATENT OFFICE 2,135,071

VEHICLE CONTROL APPARATUS

Frederick G. Folberth and William M. Folberth, Cleveland, Ohio

Application December 1, 1933, Serial No. 700,470

9 Claims. (Cl. 192—.01)

This invention relates to control apparatus for automotive vehicles and more particularly to apparatus for facilitating the control of an automobile and reducing the effort and skill required to be exercised by the operator of the vehicle.

In our co-pending United States patent application, Serial No. 522,182, filed March 12, 1931, we have described and claimed a fluid pressure actuated control apparatus whereby the clutch of an automotive vehicle is automatically disengaged when the operator closes the throttle of the vehicle engine. It has also frequently been proposed and numerous devices have been devised for actuating the brakes of an automotive vehicle by fluid pressure. The vacuum created in the intake manifold of the vehicle engine during operation is a convenient source of lower than atmospheric pressure which may be controlled to operate automatic clutch mechanisms of the type described in our above noted copending application and fluid pressure actuated brake mechanisms.

In our present invention we have provided a control system for automotive vehicles whereby a single pedal is adapted to control the operation of the vehicle engine throttle, the clutch engaging and disengaging movements, and the application and release of the vehicle brakes. With our improved arrangement the operator of the vehicle uses only one foot to control all of these operations and does not need to remove this foot from the single control pedal. It will be understood by all who are familiar with present day vehicles that this arrangement constitutes a great improvement over the usual control arrangement for automobiles in which independent pedals are provided for the operation of the vehicle clutch, the vehicle brakes and the throttle or accelerator. With our single pedal control system the operation of an automotive vehicle is greatly simplified and the effort and skill required is greatly reduced.

It is among the objects of our invention to provide an improved control system for automotive vehicles in which the starting, stopping and the acceleration and deceleration of the vehicles are controlled by a single foot operated lever or pedal; the provision, in control apparatus for automotive vehicles, of a fluid pressure actuated clutch and a fluid pressure actuated brake, together with a single unitary valve means adapted to control the action of both the brake and the clutch and to properly time the operation of these units so that the brake cannot be applied when the clutch is engaged; the provision of a control mechanism by which the vehicle brakes will be applied in case the operator either accidentally or intentionally removes his foot from the control pedal; the provision of fluid pressure actuated means for operating the clutch and brakes of an automotive vehicle which means is adapted to be controlled by movement of the usual foot operated accelerator pedal and which is particularly adapted to economical manufacture and which may be readily installed on standard types of automobiles at minimum expense.

The above and other objects of our invention will appear from the following description of one embodiment thereof, reference being had to the accompanying drawings, in which—

Figure 1 is a fragmentary view of the front end of an automobile, partly in section, and illustrating our improved control mechanism installed, the parts being in the positions they assume when the vehicle engine is running and the driver completely removes his foot from the control lever.

Figure 2 is an enlarged fragmentary view of the apparatus shown in Figure 1 but illustrating the parts in the positions they assume when the vehicle operator has depressed the operating pedal sufficiently to permit the brakes to be released but before he has moved the pedal sufficiently to cause the clutch to be engaged and the throttle to be opened to start the vehicle.

Figure 3 is an enlarged side elevation of our improved unitary valve mechanism for controlling the operation of the vehicle brakes and clutch.

Figure 4 is a vertical cross section through the valve shown in Figure 3, the valve closure member being in its top position in which both the brake and clutch operating cylinders are connected to the atmosphere.

Figure 5 is a cross sectional view of the valve shown in Figure 3 taken on line 5—5 of Figure 4.

Figure 6 is a cross sectional view of the valve shown in Figure 3 taken on line 6—6 of Figure 4.

Figure 7 is a cross sectional view of the valve shown in Figure 3 taken on line 7—7 of Figure 4.

Figure 8 is a cross sectional view generally similar to Figure 4 but illustrating the valve closure member in position to connect the clutch operating cylinder to the source of operating pressure (the vehicle intake manifold) but with the brake operating cylinder still connected to the atmosphere.

Figure 9 is a view similar to Figure 4 but illustrating the valve closure member in its lowest position in which both the brake operating cylinder and the clutch operating cylinder are shut off from the atmosphere and connected to the intake manifold suction and the top end of the piston closure member is subjected to the brake cylinder pressure to give the desired braking action.

Figure 10 is generally similar to Figure 2 but illustrates a modified control lever arrangement.

Figure 1 illustrates our control apparatus installed upon an automotive vehicle equipped with the usual clutch, brake and throttle operating pedals. It will appear as this decription progresses that with our apparatus the usual clutch and brake operating pedals might be entirely dispensed with but, as we are illustrating the application of our invention to a standard type of automobile, they will be included in this description. The vehicle brake operating lever 1 extends through the floor board 2 and is provided with a foot pedal in the usual manner. The lower end of the pedal 1 is pivoted as at 3 and operates the brake rods 4 and 5 which are connected through any suitable linkage to operate the brakes 6 on the vehicle wheels. The clutch operating lever 7 also extends through the floor board 2 and is provided with the usual foot pedal and may also be conveniently pivoted at 3. The lower end of the pedal 7 is connected to cause the clutch 8 to be disengaged when the lever 7 is moved downwardly. The usual clutch engaging springs (not shown) cause the clutch to be engaged when the pressure on the lever 7 is released and the usual brake retracting springs (not shown) will cause the lever 1 to be returned to its released position when the operating force on the lever 1 is removed.

To operate the vehicle brakes we prefer to provide a cylinder 9 in which is disposed a piston 10 having a piston rod 11 extending out through the end of the cylinder 9 and connected to the lever 1 by a cable 12. The cylinder 9 is preferably pivotally supported at its lower end on a bracket 13 which may be secured to the crank case of the vehicle engine or other suitable and convenient support.

The clutch operating cylinder 14 is pivotally supported on a similar bracket 15 and carries a piston 16 having a piston rod 17 which is connected to the clutch operating lever 7 by the cable 18. We prefer to provide the clutch operating cylinder 14 with means for permitting rapid initial movement of the piston 16 in clutch engaging direction and then relatively slow and gradual movement of the piston 16 during the actual engagement of the vehicle clutch. This mode of operation and means for accomplishing same are clearly described in our above noted co-pending application, but as details thereof do not form a part of the present invention they will not be more fully described here.

Our improved control valve, generally indicated at V, is adapted to control the fluid connections to both the brake cylinder 9 and the clutch cylinder 14. This valve V is supported by an angle pipe 19 which also provides the connection between the valve V and the interior of the vehicle engine intake manifold 20. A fluid pressure conducting conduit 21 extends from the valve V to the brake cylinder 9 and another conduit 22 extends from the valve V to the clutch cylinder 14. The single control pedal 23, as illustrated, is of the type usually used for the foot throttle control of an automobile. This pedal 23 is pivotally supported on a bracket 24 which is mounted on the dash board 2ª of the vehicle. A throttle operating lever 25 is also pivotally supported by the bracket 24 and the levers 23 and 25 are independently movable although mounted on the same supporting pin 24'. The lever 25 is provided with a lug 25' and the lever 23 is provided with a lug 23' which lugs are so disposed that they will engage and cause the lever 25 to move with the lever 23 during a part of its movement as will be later described. A rod 26 connects the lower end of the lever 25 to the throttle arm 27 which is mounted on the carburetor 28 and operates the butterfly type of throttle valve 29. The upper end 23" of the lever 23 extends beyond the pivot point 24' and is provided with an aperture through which extends the valve loading spring 30. An adjustable collar 31 is clamped to the spring 30 by the screw 31' and forms an abutment against which the end 23" of the lever 23 may strike to exert a downward pull on the spring 30. The spring 32 is secured at its lower end to a suitable bracket 33 which may be mounted on the engine block and at its upper end to a pin or bracket 34 which is carried by the end 23" of the control lever 23. This spring 32 is heavier than the spring 30 and is normally maintained in extended position under tension and therefore exerts a downward pull on the end 23" of the control lever 23. A spring 34ª connects the lower end of lever 25 to a bracket 35 on the floor board 2 and exerts a force tending to move lever 25 toward the floor board and close the throttle valve 29. The movement of lever 25 and valve 29 in closing direction is limited by the adjustable stop screw 36.

Before describing the operation of our control apparatus it will be well to describe our improved unitary brake and clutch controlling valve V. This valve is illustrated in detail in Figures 3 to 9 inclusive and reference is made to these figures of the drawings in the following description.

Our valve comprises a generally cylindrical body or housing 40 having a bore 41 extending therethrough. The upper end of the bore is closed by a cover plate or cap 42 which is secured to the housing 40 by screws 43. The joint between the cap 42 and the housing is made fluid pressure tight by a suitable packing washer 44.

A bottom cap member 45 is secured to the lower end of the housing 40 by screws 46 and is provided with a central aperture through which the valve closure member operating rod 47 extends. The cap 45 is also provided with vent holes 48 which connect the lower end of the bore 41 to the atmosphere. A stop screw 49 extends through the top end cap 42 and acts to limit the upward movement of the piston closure member C, as will be later described.

This closure member C comprises three spaced piston-like closure portions adapted to have a sliding fit within the bore 41 and connected together by portions of reduced diameter. The upper closure portion 50 is adapted to control the connections between the brake cylinder and the atmosphere. The center closure portion 51 controls the connection between the brake cylinder and the intake manifold and also between the clutch cylinder and the atmosphere and the lower closure portion 52 controls the connection between the clutch cylinder and the intake manifold. The portions 50 and 51 are connected by a rod 53 and the portions 51 and 52 are connected by a rod 54. As is best seen in Figure 4 the entire closure member C is preferably made of one piece and the operating rod 47 extends downwardly from the closure portion 52 and is provided with a hole 55 in its lower end to which is attached the spring 30. A compression spring 56 is disposed between the inner surface of the end cap 45 and the underside of the closure portion 52. This spring is normally under compression and tends to maintain the closure member C in its uppermost position against the stop screw 49, as shown in Figure 4.

The housing 40 is provided with a plurality of ports which extend through its wall and which cooperate with the closure member C to obtain the desired fluid pressure connections. The top port 57 extends through the side wall of the housing 40 and is adapted to connect the interior bore 41 with the atmosphere. The port 57 is an elongated slot (best seen in Figure 5) which extends for substantially 180° of the circumference of the bore 41. Below the port 57 and on the opposite side of the housing 40 is another port 58 which connects the bore 41 with the tube 59 to which the conduit 21, which leads to the brake cylinder 9, is attached. The atmospheric port 60 for the clutch cylinder extends through the wall of the housing 40 on the same side and below the port 58 and consists of an elongated slot similar to the port 57. Below the port 60 is the port 61 which connects the bore 41 with the tube 62 to which the conduit 22, leading to the clutch operating cylinder, is attached. Below the brake cylinder atmospheric port 57 and on the same side of the housing 40 are the vacuum ports 63 and 64. These ports extend from the bore 41 to a common chamber 65 (see Figure 7) and the threaded pipe 66 joins the chamber 65 and is adapted to be screwed into the connecting and supporting pipe 19 which leads to the intake manifold. Grooves 67 extend circumferentially around the bore 41 at each of the above noted ports. By providing these grooves the pressure on the closure portions of the closure member C is distributed around the entire circumference of the closure member and thus any tendency of the closure member to bind or seize in the bore 41 is eliminated and the closure member is freely movable vertically at all times and regardless of its position relative to the ports.

The upper end of the bore 41, above the closure portion 50 of the piston closure member C, forms a cylinder and a fluid conducting passageway 68 is formed in the wall of the housing 40 and connects the bore 41, above the closure portion 50, to the port 58. By this connection the same pressure conditions are maintained on the top of the closure member C as obtain within the brake cylinder. This is an important feature in securing the proper braking action, as will be later explained. It will be understood that the lengths of the cylindrical closure portions 50, 51 and 52 will be correlated with the vertical spacing of the ports 57, 58, 60, 61, 63 and 64 so that the proper sequence of operations of the vehicle brake and clutch will be obtained. As is best seen in Figures 3 and 5 the wall of the housing 40 may be cut away adjacent the ports 57 and 60 to facilitate the flow of air therethrough.

Referring back to Figures 1 and 2, the operation of a vehicle equipped with our improved control mechanism is as follows:

When the parts are in the positions shown in Figure 1 it will be assumed that the vehicle engine is running, thereby creating a suction or reduced pressure in the intake manifold 20, and the operator has removed his foot from the control pedal 23. The spring 32, being stronger than the spring 30, has moved the upper end 23" of the operating lever 23 downwardly against the stop 31 thus exerting a pull on the spring 30 which is transmitted to the closure member C through the operating rod 47. This downward pull on the closure member C overcomes the force of the spring 56 and moves the closure member C into its lowest position, as shown in Figure 9. When in this position the brake cylinder 9 is connected to the intake manifold suction through the conduit 21, pipe 59, port 58, bore 41, port 63, chamber 65 and pipes 66 and 19. In like manner the clutch operating cylinder 14 is connected to the intake manifold 20 through the conduit 22, pipe 62, port 61, bore 41, port 64, chamber 65 and pipes 66 and 19. Thus, the reduced pressure of the intake manifold will be applied to the lower ends of the cylinders 9 and 14 and, as they are open to the atmosphere on their upper ends, a pressure differential will be created on opposite sides of the pistons 11 and 17 and they may be moved downwardly in their respective cylinders. This movement of the pistons will be transmitted through their connecting rods and the cables 12 and 18 and will move the brake and clutch operating levers 1 and 7 downwardly disengaging the vehicle clutch and applying the vehicle brakes.

Now when the operator desires to start the vehicle he shifts into the proper gear and applies his foot to the operating pedal 23. When the parts are in the positions shown in Figure 2 the operator's foot is resting on the pedal 23 and he has moved the pedal 23 downwardly until the lug 23' strikes the lug 25' of the throttle operating lever 25. This movement is preferably accomplished by the weight of the operator's foot without the application of appreciable muscular effort. At this point an additional resistance to movement of the pedal 23 is imposed due to the spring 34 and the operator, by the difference in "feel" of the movement of the pedal 23, is advised that he has reached the throttle operating stage of the movement of the pedal 23. During the downward movement of the pedal 23 from the position shown in Figure 1 to that shown in Figure 2, the end 23" of the lever 23 has been lifted thus in part releasing the tension on the spring 30 and permitting the spring 56 to lift the closure member C into the position shown in Figure 8. In this position the brake operating cylinder 9 is connected to the atmosphere through the conduit 21, pipe 59, port 58, bore 41 and port 47. The clutch cylinder connections, however, have not changed and the clutch cylinder 14 is still connected to the intake manifold suction, as was described above in reference to Figure 1. As the lower end of the brake cylinder 9 is now connected to the atmosphere the pressure on the opposite sides of the piston 10 will be equalized and the usual brake retracting springs will be effective to release the vehicle brakes and move the operating pedal 1 to its released position. The clutch pedal 2, however, will still be held in clutch disengaged position due to the suction which is still applied to the lower end of the clutch cylinder 14.

As the operator pushes the pedal 23 further down the engine throttle will be opened due to the engagement of the lugs 23' and 25' which will cause the lever 25 to move with the lever 23. Such further movement of the lever 23 will also cause further release of the tension on the spring 30 and will permit the spring 56 to move the closure member C upwardly into the position shown in Figure 4. When in this position the brake cylinder is shut off from the intake manifold by the closure portion 51 and the clutch cylinder is shut off from the manifold suction by the closure portion 52. As the closure portions 50 and 51 have moved above the atmospheric ports 57 and 60 the brake and clutch cylinders will be connected directly to the atmosphere and, due to the equalization of pressure on the opposite sides of pistons 10 and 16, the clutch will be moved into engagement by the normal clutch engaging springs and the brake will still be released. This movement of the closure member C from the position shown in Figure 8 to that shown in Figure 4 takes place during the first part of the downward movement of the lever 23 from the position shown in Figure 2 and thus, when the operator pushes down on the lever 23, the clutch cylinder 14 will promptly be connected to the atmosphere and the clutch will be engaged thus starting the vehicle. As noted above the cylinder 14 is preferably so arranged that the initial movement of the piston 16 and the operating lever 7 in clutch engaging direction will be relatively rapid while the final engaging movement will be relatively slow in order to give smooth clutching action. This may be accomplished in a number of ways which are not described here because they do not form a part of the present invention.

When the operator releases the pressure of his foot upon the pedal 23 the reverse of the above described action will take place. First the vehicle engine will be throttled down, next the valve closure member C will be moved from the position of Figure 4 into that of Figure 8 and the clutch cylinder will be connected to the intake manifold suction thus disengaging the clutch. When the operator further releases the pressure on the lever 23 the tension on the spring 30 will be increased due to the action of the spring 32 and this will move the closure member C toward the position shown in Figure 9. As noted above, when in this position the lower end of the brake cylinder is connected to the intake manifold suction and shut off from the atmosphere. It will also be noted that the intake manifold suction is now applied to the upper end of the closure member C through the passage 68. When the suction within the bore 41 above the closure member C reaches a point where it will overcome the tension of the spring 30 the closure member C will be moved upwardly, due to the action of atmospheric pressure on the underside of the closure portion 52, until the port 57 is opened and the port 63 is closed. This will permit air under atmospheric pressure to enter the bore 41 through the port 57 and will reduce the vacuum within the brake cylinder and also on top of the closure member C. When this occurs the tension on the spring 30 will again be great enough to move the closure member C downwardly until the atmospheric connections through the port 57 is closed off and the vacuum connection through the port 63 again completed. Thus, it will be seen that by the by-pass passage 68 and the piston action of the closure member C a self lapping type of brake control valve is obtained and the degree of application of the vehicle brakes may be varied in accordance with the degree of tension applied to the spring 30. Thus, the operator, by proper manipulation of the operating lever 23 between the position of this lever shown in Figure 1 and its position as shown in Figure 2, may control the application and release of the vehicle brakes to secure and maintain any desired degree of braking force.

Figure 10 illustrates a modified arrangement of levers for operating the throttle 29 and the brake and clutch control valve V. The lever or pedal 75 is the usual foot throttle pedal and is pivotally supported at 76. The downwardly extending portion 77 of the lever 75 is connected to the throttle operating lever 27 by the rod 78. A spring 79 normally maintains the throttle operating lever 27 against the adjustable stop screw 36 thus holding the throttle valve 29 in idling position. An auxiliary lever 80 is conveniently pivoted at 76, independent of the lever 75 however, and has an extension 80' which engages the operating spring 30 of the valve V in the same manner as illustrated in Figure 2. The lever 80 is provided with a lug portion 81 through which the adjusting screw 82 extends. The lower end of the screw 82 is adapted to engage the lever 75 at 83 and the end of the lever 80 is provided with a pad 84, preferably of sheepskin, felt or other soft material, which will prevent scratching the vehicle driver's shoe. This pad is preferably disposed substantially above the inner end of the throttle operating lever 75 and is normally spaced from the end of lever 75 a distance just slightly greater than the thickness of the operator's foot.

When the parts are in the positions shown in Figure 10 it may be assumed that the operator has just inserted his foot between the pad 84 and the pedal 75 but has not exerted upward or downward pressure on these levers. When in this position the throttle 29 is closed, the valve V has been moved by the spring 79, through action of the lever 75 upon the adjustable screw 82 to move the end 80' of lever 80 downwardly, just enough to cause disengagement of the vehicle clutch but not enough to cause application of the vehicle brakes. If the operator wishes to start the vehicle he depresses the lever 75 whereupon the valve V will be moved by means of spring 56 into position to permit the clutch to be engaged and the throttle will be opened to speed up the engine. If the operator now wishes to apply the vehicle brakes he rocks his foot upwardly about his heel thus removing the pressure from the lever 75 and permitting the spring 79 to return to its normal position and lifting the end of the lever 80 with the top of his foot. This upward movement of the pad 84 will cause the end 80' of lever 80 to move downwardly exerting a tension on the spring 30 which will cause the vehicle brakes to be applied to the desired degree, as has been previously explained in connection with the operation of the valve V. With this arrangement the brakes of the vehicle will not normally be held in applied position when the vehicle engine is running and the operator has completely removed his foot from operating position between the levers 75 and 80 although the clutch will be maintained in disengaged position.

From the above description it will be seen that we have provided a control mechanism for automotive vehicles by which automatic control of the vehicle clutch, smooth and flexible fluid pressure control of the vehicle brakes to obtain any desired degree of braking action, and the usual control of the vehicle throttle may be obtained by simple movement of only one foot of the operator. Our apparatus, and particularly our improved control valve, is extremely simple, compact and trouble proof, and although we have described the illustrated embodiment of our invention in considerable detail, it will be understood by those skilled in the art that variations and modifications may be made in the particular form of apparatus employed without departing from the spirit of our invention. Various types of operating pedal arrangements may be utilized. We do not, therefore, wish to be limited to the specific form herein shown and described but claim as our invention all embodiments thereof coming within the scope of the appended claims.

We claim:

1. In control apparatus for an automotive vehicle having a clutch, a brake and a throttle, a lever adapted to be operated by the vehicle driver's foot to control the throttle and clutch, a second lever above said first named lever and having a portion adapted to be engaged by the top of the driver's foot, said second lever being adapted to control the vehicle brake.

2. In combination in an automotive vehicle having a fluid pressure actuated clutch and brake, a control valve for controlling the operation of said clutch and brake, said valve including a tubular housing closed at one end and having a plurality of ports extending through its wall, a piston type closure member slidably disposed in said housing and having a plurality of closure portions adapted to control the flow of actuating fluid through said ports in said housing, said closure portions and said ports being so spaced and positioned that said clutch will be disengaged before said brake is applied, and a fluid passage extending from the closed end of said housing above the end of the piston closure member to one of said ports whereby the fluid pressure conditions at said port will be maintained in the closed end of said housing.

3. In a control system of the type described, fluid pressure actuated clutch operating means, fluid pressure actuated brake actuating means, a valve for controlling said fluid pressure actuated means, fluid pressure conducting connections between said valve and said means, said valve and the atmosphere and said valve and a source of reduced pressure, said valve including a piston closure member movable in a tubular housing closed at one end and open to the atmosphere at its opposite end, said closure member being adapted to control the fluid connections to both the brake and clutch actuating means, and a fluid passage from said closed end of said housing to the fluid pressure connections between said valve and said brake actuating means whereby the pressure conditions established in the brake actuating means are also maintained on one end of said piston closure member.

4. In a control system of the type described, fluid pressure actuated clutch operating means, fluid pressure actuated brake actuating means, a valve for controlling said fluid pressure actuated means, fluid pressure conducting connections between said valve and said means, said valve and the atmosphere and said valve and a source of reduced pressure, said valve including a piston closure member movable in a tubular housing closed at one end and open to the atmosphere at its opposite end, said closure member being adapted to control the fluid connections to both the brake and clutch actuating means, a fluid passage from said closed end of said housing to the fluid pressure connections between said valve and said brake actuating means whereby the pressure conditions established in the brake actuating means are also maintained at one end of said piston closure member, and an operating spring adapted to exert a force opposing the action of the brake operating pressure on the closure member and means for varying the force so applied by said spring whereby the braking effort may be varied.

5. In apparatus of the type described, a combination control valve comprising a tubular housing having a plurality of ports and a piston closure member operable therein, said closure member being adapted to control the flow of fluid through the ports to effect fluid pressure connection to a brake operating device and a clutch operating device, said valve including a spring adapted to transmit a moving force to the closure member and means for applying the brake device fluid pressure to oppose said spring, the clutch device fluid pressure ports being so disposed relative to said closure member that the fluid connections to the clutch device are not changed by the action of the brake pressure on the closure member.

6. In a control system of the type described, fluid pressure actuated clutch operating means, independent fluid pressure actuated brake actuating means, a valve for controlling said fluid pressure actuated means, fluid pressure conducting connections between said valve and said means, said valve and the atmosphere and said valve and a source of reduced pressure, said valve including a piston closure member movable in a tubular housing closed at one end and open to the atmosphere at its opposite end, said closure member being adapted to control the fluid connections to both the brake and clutch actuating means.

7. In apparatus of the type described, a combination control valve comprising a tubular housing having a plurality of ports and a piston closure member operable therein, said tubular housing having circumferentially extending grooves at each of said ports, said closure member being adapted to control the flow of fluid through the ports to effect fluid pressure connection to a brake operating device and a clutch operating device, said valve including a spring adapted to transmit a moving force to the closure member and means for applying the brake device fluid pressure to oppose said spring, the clutch device fluid pressure ports being so disposed relative to said closure member that the fluid connections to the clutch device are not changed by the action of the brake pressure on the closure member.

8. In a control system of the type described, fluid pressure actuated clutch operating means, independent fluid pressure actuated brake actuating means, a valve for controlling said fluid pressure actuated means, fluid pressure conducting connections between said valve and said means, said valve and the atmosphere and said valve and a source of reduced pressure, said valve including a piston closure member movable in a tubular housing closed at one end and open to the atmosphere at its opposite end, said tubular housing having a plurality of ports in its wall and having circumferential grooves formed on the inner surface of its wall adjacent each of said ports, said closure member being adapted to control the fluid connections to both the brake and clutch actuating means.

9. In combination in an automotive vehicle having a fluid pressure actuated clutch and brake, a control valve for controlling the operation of said clutch and brake, said valve including a tubular housing closed at one end and having a plurality of ports extending through its wall, a piston type closure member slidably disposed in said housing and having a plurality of closure portions adapted to control the flow of actuating fluid through said ports in said housing, the inner surface of the wall of said housing being circumferentially grooved at said ports, said closure portions and said ports being so spaced and positioned that said clutch will be disengaged before said brake is applied, and a fluid passage extending from the closed end of said housing above the end of the piston closure member to one of said ports whereby the fluid pressure conditions at said port will be maintained in the closed end of said housing.

FREDERICK G. FOLBERTH.
WILLIAM M. FOLBERTH.